United States Patent

[11] 3,549,167

| [72] | Inventor | Guenther Haverbeck |
| | | Plochingen, Germany |
| [21] | Appl. No. | 731,469 |
| [22] | Filed | May 23, 1968 |
| [45] | Patented | Dec. 22, 1970 |
| [73] | Assignee | Daimler-Benz Aktiengesellschaft |
| | | Stuttgart-Unterturkheim, Germany |
| [32] | Priority | May 26, 1967 |
| [33] | | Germany |
| [31] | | No. D53170 |

[54] JOINT CONNECTION FOR THE SUSPENSION OF STEERABLE WHEELS OF A MOTOR VEHICLE
21 Claims, 4 Drawing Figs.

[52] U.S. Cl. .................................................. 280/96.2;
    287/85, 287/90
[51] Int. Cl. ..................................................... B60g 3/00
[50] Field of Search............................................ 280/96.2,
    96.2(2); 287/85(A), 87, 90(A), 90(B), 90(C)

[56] References Cited
UNITED STATES PATENTS
| 2,973,980 | 3/1961 | Vogt et al. ..................... | 287/87 |
| 3,037,787 | 6/1962 | Gottschald .................... | 287/85X |
| 3,039,787 | 6/1962 | Meyer ........................... | 287/90X |
| 3,075,786 | 1/1963 | Freers et al. .................. | 280/96.2 |
| 3,237,962 | 3/1966 | Kraus et al. ................... | 280/96.2 |
| 3,282,602 | 11/1966 | Willingshofer et al. ....... | 280/96.2 |
| 3,337,232 | 8/1967 | Peickii et al. ................. | 280/95 |

FOREIGN PATENTS
| 1,011,227 | 11/1965 | Great Britain................ | 280/96.2 |

*Primary Examiner*—Kenneth H. Betts
*Attorney*—Craig, Antonelli, Stewart & Hill

ABSTRACT: A joint connection for the suspension of steerable wheels of a motor vehicle which is disposed between the wheel carrier and a wheel guide member, especially a cross guide member pivotally connected with the wheel carrier, in which an elastic intermediate element is provided between an inner and an outer joint part; the intermediate element is so constructed and/or arranged that its yieldingness is greater in the direction of the vehicle longitudinal axis than transversely thereto.

PATENTED DEC 22 1970 3,549,167

INVENTOR
GUENTHER HAVERBECK

BY Craig & Antonelli
ATTORNEYS 3,549,167

JOINT CONNECTION FOR THE SUSPENSION OF STEERABLE WHEELS OF A MOTOR VEHICLE

BACKGROUND OF THE INVENTION

The present invention relates to a joint connection for the suspension of steerable wheels, especially of the front wheels of a motor vehicle between the wheel carrier and a wheel guide member pivotally connected with the same, especially a cross guide member, and aims above all at an improvement of the driving properties of the vehicle by a more shock-free rolling off of the wheels, especially with respect to rapidly succeeding road unevenesses such as cobble stone pavements or the like.

SUMMARY OF THE INVENTION

Accordingly, the present invention essentially consists in that an elastic intermediate layer or inset is provided between an inner and an outer joint part of the joint which is so constructed and/or so arranged that the yieldingness of the elastic intermediate layer or inset is larger in the direction of the vehicle longitudinal axis than transversely thereto. Preferably the elastic intermediate layer or inset is constructed as a rubber ring surrounding the inner joint part either completely or partly or is constructed as correspondingly arranged rubber ring parts, for example, in such a manner that the rubber ring provided as elastic intermediate element is provided with apertures or interrupted in the vehicle longitudinal direction in front and/or to the rear of the joint pin.

By this construction or arrangement of the elastic intermediate element, the latter is effective relatively soft in the vehicle longitudinal direction by reason of the small spring constant but relatively stiff in the vehicle transversely direction by reason of a large spring constant so that notwithstanding the interposed yieldingness, a change in camber of the wheels is avoided.

Further details and features of the present invention are concerned with the limitation of the axial play preferably provided simultaneously in the direction of the steering pin axis as well as a construction of the joint connection that is appropriate in particular as regards assembly.

Accordingly, it is an object of the present invention to provide a joint connection for the wheel suspension of steerable wheels which avoids by simple means the aforementioned drawbacks and shortcomings encountered in the prior art.

Another object of the present invention resides in a joint connection for the suspension of steerable wheels of a motor vehicle which exhibits improved driving characteristics and assures a more shock-free rolling off of the wheels, especially caused by road unevenesses rapidly following one another.

A further object of the present invention resides in a joint connection for the suspension especially of steerable wheels which assures a yieldingness in the vehicle longitudinal direction that is larger than the yieldingness in the vehicle transverse direction.

Still a further object of the present invention resides in a joint connection for the steerable wheels of motor vehicles which avoids any change in camber of the wheels notwithstanding the improved absorption of rapidly succeeding road shocks and impacts.

Still another object of the present invention resides in a joint connection for the suspension of steerable wheels in which a limit of the axial play provided in the direction of the steering pin axis is achieved by simple structural means.

A further object of the present invention resides in a joint connection for the suspension of steerable wheels which is simple in construction, can be readily assembled and involves only simple parts.

These and further objects, features, and advantages of the present invention will become more obvious from the following description when taken in connection with the accompanying drawing which shows, for purposes of illustration only, several embodiments in accordance with the present invention, and wherein.

Figure 1:
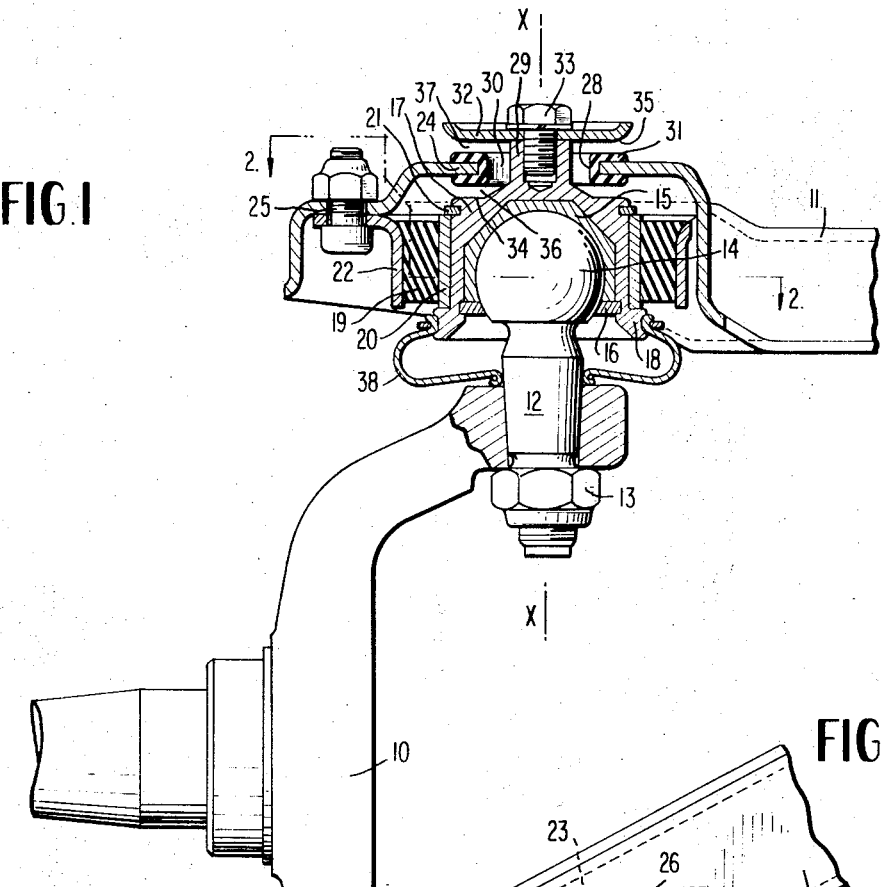
FIG. 1 is a cross-sectional view of a joint connection between the wheel carrier and an upper guide member with the cross section taken along line 1–1 of FIG. 2.

Referring now to the drawing wherein like reference numerals are used throughout the various views to designate like parts, the wheel carrier 10 is connected in a conventional manner with the vehicle superstructure (not shown) by two superposed cross guide members of which the upper guide member is indicated by reference numerals 11. The joint connection between the wheel carrier 10 and the upper cross guide member 11 includes a steering pin 12 whose axis $x$–$x$ coincides approximately with the steering axis of the wheel and which is securely clamped within the wheel carrier 10 by means of the nut 13. The joint ball 14 made in one piece with the steering pin 12 is surrounded by a bearing socket 15 consisting, for example, of a conventional synthetic resinous material, of a bearing metal or the like, which in its turn, secured by a snap or spring ring 16, is inserted from below into a hollow cap-shaped joint part 17.

The rubber ring 19 serving as elastic intermediate element is assembled over the joint part 17 up to an abutment collar 18 at the latter by means of the inner bushing or sleeve 20 adheringly connected with the rubber ring 19 by vulcanization; the sleeve 20 is axially secured on the joint part 17 by the collar 18, on the one hand, and by a spring ring 21, on the other, and is able to deform relatively freely movably in the vertical, axial direction. The rubber ring 19 is connected on its outside with an outer sleeve or bushing 22 also adheringly connected therewith, for instance, by vulcanization or the like. The sleeve 22 is provided with three flanges 23 by means of which it is secured at the horizontal wall part 24 extending transversely to the axis $x$–$x$ of the steering pin 12 and forming essentially the joint eye of the upper guide member 11 by means of three bolts or screws 25. Two of the bolts 25 extend through slots 26 provided in the wall part 24 which extend along a circular arc about the axis of the third bolt 25 so that the outer sleeve 22 together with the rubber ring 19 and the inner joint parts is adjustable within certain limits in the driving direction about the axis of this third bolt relative to the upper guide member for purposes of the adjustment of the wheel caster.

Figure 2:
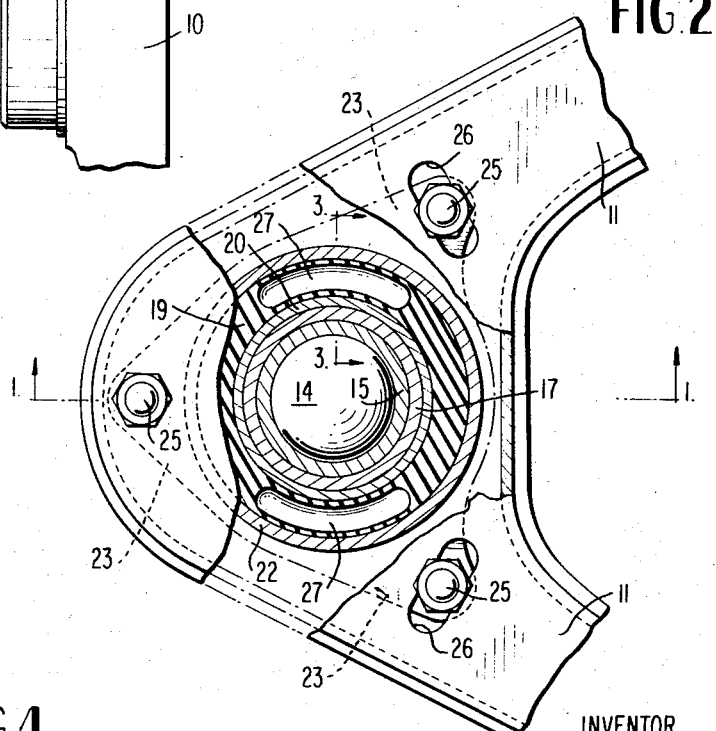
FIG. 2 is a top plan view on the joint connection of FIG. 1 with certain parts shown in cross section, taken along line 2–2 of FIG. 1.
Figure 3:
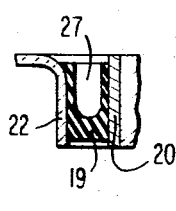
FIG. 3 is a partial cross-sectional view taken along line 3–3 of FIG. 2.

As shown in FIGS. 2 and 3, the rubber ring 19 is provided in the approximately vertical vehicle longitudinal plane extending through the axis $x$–$x$ with apertures 27 so that the rubber ring 19 is relatively soft in this plane and is able to yield relatively strongly whereas it is constructed solid in the vehicle transverse direction and therefore exhibits only a slight yieldingness in this direction. Consequently, shocks and vibrations acting in the driving direction can be absorbed softly which effects a quiet rolling off of the wheel whereas camber changes practically cannot occur by reason of the hardness of the rubber ring 19 in the transverse direction.

Figure 4:
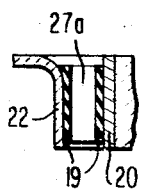
FIG. 4 is a partial cross-sectional view, similar to FIG. 3, of a modified embodiment of FIG. 3.

Instead of a single aperture 27 terminating dead ended, the rubber ring 19 can also be provided with apertures in the form of through-bores 27a (FIG. 4) or the like.

The wall part 24 is provided with a center aperture 28 approximately coaxial to the axis of its joint part 17, through which extends a pin 29 of the joint part 17 with radial play 30 whereby the edge of the wall part 24 surrounding the center aperture is provided with a rubber ring 31 having a U-shaped cross section. A disc or dish-shaped abutment 32 is secured at the upper free end of the pin 29 by means of a bolt 33. The arrangement is thereby made in such a manner that a predetermined axial play 36 and 37 exists between the upper end face of the joint part 17 and the lower end face 35 of the abutment part 32, on the one hand, and the two ends faces of the rubber ring 31, on the other, in such a manner that during vertical movements between the joint pin 12 or the joint part 17 and the joint eye of the upper guide member 11, the rubber ring 31 as abutment cooperates with the end faces 34 and 35 as counter abutments and limits these movements corresponding to the play 36 and 37.

A sealing sleeve 38 seals the joint between the joint part 17 and the wheel carrier 10.

While I have shown and described only two embodiments in accordance with the present invention, it is understood that the same is not limited thereto but is susceptible of numerous changes and modifications as known to a person skilled in the art, and I therefore do not wish to be limited to the details shown and described herein but intend to cover all such changes and modifications as are encompassed by the scope of the appended claims.

I claim:

1. A joint connection for the suspension of steerable wheels of a motor vehicle between the wheel carrier and a wheel guide member pivotally connected therewith, especially a cross guide member, said joint including inner and outer joint parts and intermediate elastic means provided between said inner and outer joint parts and including elastic ring means at least partly surrounding the inner joint part, said intermediate elastic means being interposed between a joint part which is universally supported on a steering pin of the wheel carrier forming said inner joint part, on the one hand, and a bearing eye forming the outer joint part, on the other, abutment means for limiting the elastic play of the intermediate elastic means in the axial and radial directions, wherein the outer joint part is operatively connected with a wall part extending transversely to the steering pin axis at the wheel guide member, said wall part having an aperture arranged approximately in the steering pin axis, and wherein the inner joint part is operatively connected with an abutment pin extending through said last-mentioned aperture and having abutment means, the boundary walls of the wall part surrounding said last-mentioned aperture being provided with abutment surfaces, and said abutment surfaces having a spacing from an abutment surface of said abutment means and of said inner joint part which limit the axial elastic play of the joint parts.

2. A joint connection according to claim 1, wherein at least the abutment surfaces of one of the inner and outer joint parts are constituted by an elastic material in such a manner that the edge of the transversely disposed wall part surrounding said aperture is provided with an elastic ring serving as abutment means and having an essentially U-shaped cross section.

3. A joint connection according to claim 2, wherein the elastic ring means interposed as elastic intermediate means is placed, on the one hand, over a joint part surrounding a joint ball of the steering pin forming simultaneously the abutment surfaces for limiting the axial elastic play of the elastic ring means and, on the other, is surrounded by a metallic sleeve of the outer joint part which is detachably connected with the transversely extending wall part forming a counter abutment.

4. A joint connection according to claim 3, wherein threaded means are used for connecting said metallic sleeve with said wall part.

5. A joint connection according to claim 4, wherein the elastic ring means is adheringly connected with the metallic sleeve of the outer joint part and is placed by means of an inner metallic sleeve adheringly connected therewith over the hollow inner joint part.

6. A joint connection according to claim 1, wherein the abutment pin extends through said aperture with radial play.

7. A joint connection according to claim 1, wherein the intermediate elastic means effectively produces a yieldingness in the steering axis which is larger in the direction of the vehicle longitudinal axis than the yieldingness in a direction transverse thereto.

8. A joint connection for the suspension of steerable wheels of a motor vehicle between the wheel carrier and a wheel guide member pivotally connected therewith especially a cross guide member, said joint including inner and outer joint parts, intermediate elastic means provided between said inner and outer joint parts, and abutment means for limiting the elastic play of the intermediate elastic means in the axial direction, wherein the outer joint part is operatively connected with a wall part extending transversely to the steering pin axis at the wheel guide member, said wall part having an aperture arranged approximately in the steering pin axis, and wherein the inner joint part is operatively connected with an abutment pin extending through said last-mentioned aperture and having abutment means, the boundary walls of the wall part surrounding said last-mentioned aperture being provided with abutment surfaces, and said abutment surfaces having a spacing from an abutment surface of said abutment means and of said inner joint part which limit the axial elastic play of the joint parts.

9. A joint connection according to claim 8, comprising further abutment means for limiting the elastic play of the elastic intermediate means also in a radial direction.

10. A joint connection according to claim 9, wherein at least the abutment surfaces of one of the inner and outer joint parts are constituted by an elastic material in such a manner that the edge of the transversely disposed wall part surrounding said aperture is provided with an elastic ring serving as abutment means and having an essentially U-shaped cross section.

11. A joint connection according to claim 10, wherein the elastic ring means interposed as elastic intermediate means is placed, on the one hand, over a joint part surrounding a joint ball of the steering pin forming simultaneously the abutment surfaces for limiting the axial elastic play of the elastic ring means and, on the other, is surrounded by a metallic sleeve of the outer joint part which is detachably connected with the transversely extending wall part forming a counter abutment.

12. A joint connection according to claim 8, wherein the abutment pin extends through said aperture with radial play.

13. A joint connection according to claim 8, comprising further abutment means for limiting the elastic play of the elastic intermediate means also in a radial direction.

14. A joint connection for the suspension of steerable wheels of a motor vehicle between the wheel carrier and a wheel guide member pivotally connected therewith, especially a cross guide member, said joint including inner and outer joint parts and intermediate elastic means provided between said inner and outer joint parts, abutment means for limiting the elastic play of the intermediate elastic means in the axial direction, the intermediate elastic means including elastic ring means placed, on the one hand, over a joint part surrounding a ball joint of the steering pin forming simultaneously the abutment surfaces for limiting the axial elastic play of the elastic ring means and, on the other hand, is surrounded by a metallic sleeve of the outer joint part which is detachably connected with the transversely extending wall part forming a counter abutment, threaded means being provided for connecting said metallic sleeve with said wall part, wherein the elastic ring means is adheringly connected with the metallic sleeve of the outer joint part and is placed by means of an inner metallic sleeve adheringly connected therewith over the hollow inner joining part.

15. A joint connection according to claim 14, wherein the intermediate elastic means effectively produces an yieldingness in the steering axis which is larger in the direction of the vehicle longitudinal axis than the yieldingness in the direction transverse thereto.

16. A joint connection for the suspension of steerable wheels of a motor vehicle between the wheel carrier and a wheel guide member, especially a cross guide member, pivotally connected therewith approximately in the steering axis of the wheel, characterized in that said joint includes inner and outer joint parts and intermediate elastic means provided between said inner and outer joints parts for effectively producing a yieldingness in the steering axis which is larger in the direction of the vehicle longitudinal axis than the yieldingness in a horizontal direction transverse thereto.

17. A joint connection according to claim 16, wherein said intermediate elastic means includes elastic ring means at least partly surrounding the inner joint point and is so arranged that its yieldingness is greater in the vehicle longitudinal axis than transversely thereto, said elastic ring means essentially consisting of elastic ring parts having a ring axis corresponding approximately to the steering axis and being provided with recessed portions in the direction of the vehicle longitudinal axis, wherein said recessed portions are provided in front of and to the rear of the steering axis.

18. A joint connection according to claim 17, wherein said elastic ring means completely surrounds the inner joint part.

19. A joint connection according to claim 17, wherein the elastic intermediate means is interposed between a joint part which is universally supported on a steering pin of the wheel carrier forming said inner joint part, on the one hand, and a bearing eye forming the outer joint part, on the other.

20. A joint connection according to claim 17, further comprising abutment means for limiting the elastic play of the elastic intermediate means in the axial direction.

21. A joint connection according to claim 17, comprising further abutment means for limiting the elastic play of the elastic intermediate means in a radial direction.